United States Patent
Briseno et al.

(10) Patent No.: US 11,194,762 B2
(45) Date of Patent: Dec. 7, 2021

(54) SPATIAL INDEXING USING RESILIENT DISTRIBUTED DATASETS

(71) Applicant: ORACLE INTERNATIONAL CORPORATION, Redwood Shores, CA (US)

(72) Inventors: Hector Alejandro Saucedo Briseno, Tlajomulco de Zuniga (MX); Roberto Infante Suarez, Zapopan (MX); Siva K. Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 40 days.

(21) Appl. No.: 16/849,806

(22) Filed: Apr. 15, 2020

(65) Prior Publication Data

US 2020/0371993 A1 Nov. 26, 2020

Related U.S. Application Data (60) Provisional application No. 62/850,820, filed on May 21, 2019.

(51) Int. Cl.
*G06F 16/13* (2019.01)
*G06F 16/182* (2019.01)
*G06F 16/901* (2019.01)
*G06F 16/22* (2019.01)

(52) U.S. Cl.
CPC ......... *G06F 16/134* (2019.01); *G06F 16/182* (2019.01); *G06F 16/2237* (2019.01); *G06F 16/2246* (2019.01); *G06F 16/2272* (2019.01); *G06F 16/9027* (2019.01)

(58) Field of Classification Search
CPC ............ G06F 16/2246; G06F 16/2272; G06F 16/2237; G06F 16/29; G06F 16/134; G06F 16/182; G06F 16/13; G06F 16/9027
USPC .................................. 707/741, 743
See application file for complete search history.

(56) References Cited

U.S. PATENT DOCUMENTS

| | | | |
|---|---|---|---|
| 6,950,828 B2 | 9/2005 | Shaw et al. | |
| 7,877,405 B2 | 1/2011 | Kothuri et al. | |
| 8,386,468 B2 | 2/2013 | Hu et al. | |
| 8,533,181 B2 | 9/2013 | Hu et al. | |
| 2005/0091223 A1 | 4/2005 | Shaw | |

(Continued)

OTHER PUBLICATIONS

Giachetta, Roberto; / Computers & Graphics 49, A Framework for Processing Large Scale Geospatial and Remote Sensing Data in MapReduce Environment; pp. 37-46, (2015) Budapest Hungary.

(Continued)

*Primary Examiner* — Shahid A Alam
(74) *Attorney, Agent, or Firm* — Kraguljac Law Group, LLC (57) ABSTRACT

Systems, methods, and other embodiments associated with indexing spatial data in a distributed file system are described. A query window defining a portion of a spatial data space is received, and candidate partitions containing the spatial data within the query window are identified. An intermediate partition dataset comprising each of the identified candidate partitions is created. Execution of a distributed function is limited to the identified candidate partitions, and a data structure including at least one record included in the result of the query is generated, and returned as the result of the query over a communication network.

20 Claims, 7 Drawing Sheets

(56) References Cited

U.S. PATENT DOCUMENTS

| | | | | |
|---|---|---|---|---|
| 2005/0203932 | A1* | 9/2005 | Kothuri | G06F 16/29 |
| 2005/0222978 | A1* | 10/2005 | Drory | G06F 16/29 |
| 2007/0253642 | A1* | 11/2007 | Berrill | G06F 16/9027 |
| | | | | 382/305 |
| 2008/0162424 | A1* | 7/2008 | Adler | G06F 16/283 |
| 2011/0161328 | A1* | 6/2011 | Park | G06F 16/29 |
| | | | | 707/743 |
| 2012/0054195 | A1 | 3/2012 | Hu et al. | |
| 2012/0191699 | A1* | 7/2012 | George | G06F 16/24554 |
| | | | | 707/718 |
| 2012/0278321 | A1* | 11/2012 | Traub | G06F 16/3331 |
| | | | | 707/736 |
| 2014/0244635 | A1* | 8/2014 | Hu | G06F 16/245 |
| | | | | 707/724 |
| 2015/0049944 | A1 | 2/2015 | Bamba et al. | |
| 2015/0149479 | A1 | 5/2015 | Geringer et al. | |
| 2017/0337229 | A1 | 11/2017 | Infante Suarez | |

OTHER PUBLICATIONS

Zaharia, Matei, et al.; Resilient Distributed Datasets: A Fault-Tolerant Abstraction for In-Memory Cluster Computing; pp. 1-14; University of California, Berkeley, CA; downloaded on Mar. 16, 2020 from: https://cs.stanford.edu/~matei/papers/2012/nsdi_spark.pdf.

Cary, Ariel, et al.; "Experiences on Processing Statial Data with Mapreduce." International Conference on Scientific and Statistical Database Management, Springer, Berlin, Heidelberg, 2009 pp. 1-18.

Cary, Ariel, et al. "Leveraging Cloud Computing in Geodatabase Management." Granular Computing (GrC), 2010 IEEE International Conference on. IEEE, 2010 pp. 73-78.

\* cited by examiner

SPATIAL INDEXING USING RESILIENT DISTRIBUTED DATASETS

CROSS REFERENCE TO RELATED APPLICATIONS

This disclosure claims the benefit of U.S. Provisional Patent Application Ser. No. 62/850,820 filed May 21, 2019, titled "Spatial Indexing Using Resilient Distributed Datasets," which is assigned to the present assignee and incorporated herein in its entirety.

BACKGROUND

Spatial data is information that represents objects defined in a geometric space. For example, spatial data may include map data that describes geographic features and boundaries (i.e., roads, rivers, political boundaries, etc.) within a spatial coordinate system (e.g., longitude and latitude). Spatial data may take different forms, such as vector data or raster data. Vector data describes geometries within a coordinate system using points, lines and polygons to represent elements. By contrast, raster data includes images (e.g., satellite photos) that graphically represent locations in the coordinate system.

Storing and querying spatial data can be a complex task. As one example, consider spatial data used for mapping purposes. The spatial data for mapping can include large quantities of both raster data and vector data when mapping even a single county or municipality. Thus, when mapping more-expansive geographic localities, the amount of data can quickly exceed gigabytes, if not terabytes or greater. Existing distributed spatial frameworks support only a fixed set of data formats, as each data format has traditionally required its own dedicated distributed task to process that data format.

Accordingly, locating a particular portion of the spatial data can be a difficult task when such a large amount of data is present. Attempts to improve the efficiency of querying spatial data sought to avoid processing unnecessary spatial partitions, but such attempts still required distributed tasks used to work with those unnecessary partitions to be created and launched. The time and computational resources required to process those unnecessary partitions becomes excessive when there are several partitions to be processed, as is the case for large spatial data sets.

The inefficiencies of existing solutions are made worse by spatial data included in records spanning more than a single spatial partition. Traditionally, records comprising spatial data occupying more than a single partition have been replicated across each of the partitions. Such a step has thus far been necessary because each of the partitions are processed independently by distributed tasks. Once the spatial data have been spatially filtered by each distributed task, a separate step, in addition to the steps performed to independently process each of the partitions, has been required to remove duplicated records.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Computerized systems and methods are described herein that efficiently index spatial data stored in a distributed file system by suppressing the performance of distributed tasks to process unnecessary partitions, and limiting the creation of duplicative processing results. The present systems and methods can also support a plurality of different data formats, optionally any data format, by abstracting spatial information from the underlying format of the spatial data, without regard to the information compliant to a specific format.

As mentioned above, in general, the time required to perform operations such as a query of spatial data can be improved by suppressing, or otherwise avoiding the launch of distributed tasks for unnecessary (non-candidate) partitions. An "unnecessary partition" is any partition that does not contain spatial data, such as a record or a portion of a record, that is a potential result of a spatial data search query. A "candidate partition" is any partition that does contain spatial data that is a potential result of a spatial data search (e.g., as defined by a search query window). In general, the search query window is a selected or requested geometry used to perform the query on the spatial data set. Then only regions/partitions of the spatial data set that have a spatial relationship (e.g., an intersection) with the query window are typically candidate partitions.

To avoid launching a distributed task for an unnecessary partition, source Resilient Distributed Datasets (source "RDD") comprising all partitions to be searched are processed to create an intermediate search RDD. The intermediate search RDD includes, and is optionally limited to only include, the candidate partitions containing potential results of the spatial data search. Then only the intermediate search RDD including only the candidate partitions are passed along for final processing of the search query. Thus all the non-candidate partitions are not processed during these steps and the associated distributed tasks that would have been executed are avoided and not executed.

For example, a lazy evaluation feature of the RDD can be utilized in one embodiment to limit the scope of the search to candidate partitions. Leveraging the lazy evaluation feature delays an operation until a triggering condition is satisfied. In the present example, to exclude at least some, and optionally all of the unnecessary partitions (non-candidate partitions) from the intermediate search RDD, the lazy evaluation feature is utilized to dynamically map the candidate partitions in the source RDD to the intermediate search RDD. The lazy evaluation feature delays or suppresses the transformations that would dynamically map unnecessary partitions from the source RDD to the intermediate search RDD.

Also as mentioned above, duplicative or repetitive processing of spatial data during spatial indexing is time consuming, and computationally-intensive. When a spatial data record is duplicated across multiple partitions, creating record replicas, each record replica will contain the identification of all of the partitions that contain such a record in a record partition list. To mitigate the time and computational resources consumed to spatially index the data set, the present systems and methods do not retrieve and include all of the replica records from the partitions where the record is duplicated.

For example, in one embodiment, duplicate data records are removed to improve processing efficiency. A record partition list of partition IDs in which a record appears is generated for the record. The record partition list is generated in each partition according to the following technique. Only the record replica in the partition with the largest identification number contains the list of all other partitions where the record replicas having lower identification numbers are found. The record replica in the partition with the second-largest identification number contains the list of all other partitions with record replicas having lower identification numbers (e.g., excluding the record replica in the partition with the largest identification numbers), and so on, until the record replica in the partition with the lowest identification number contains no partition IDs.

To illustrate, consider a record X that spans partitions "P" having identification numbers P2, P3 and P5. Thus record X is duplicated in partitions P2, P3, and P5. The present technology keeps track of the partitions containing a record replica, by storing a limited or minimum amount of information required to efficiently filter and remove duplicate records. Duplicate records can be removed before a record is about to be spatially filtered during a distributed spatial search.

In one embodiment, a record can be considered eligible to be part of the search result (e.g., not removed as being duplicative) if that record belongs to the candidate partition having the lowest identification number in the current spatial search. This will be described in more detail below and with reference to FIG. 5.

According to another embodiment, the present spatial indexing apparatus and method are independent of the data format of the RDD, and optionally compatible with RDDs of any data format. An interface abstracts spatial information from the underlying data format, allowing use of the extracted spatial information without requiring full compatibility with the spatial data format. For example, an interface called SparkRecordInfoProvider can be utilized. According to one embodiment, the SparkRecordInfoProvider interface employs an operation, referred to as getGeometry( ) which is compatible with any data format to extract the geometry of the given record, independently of the format of the data record. The present technique for providing independence of content format is further described in more detail below and with reference to FIG. 6.

Figure 1:
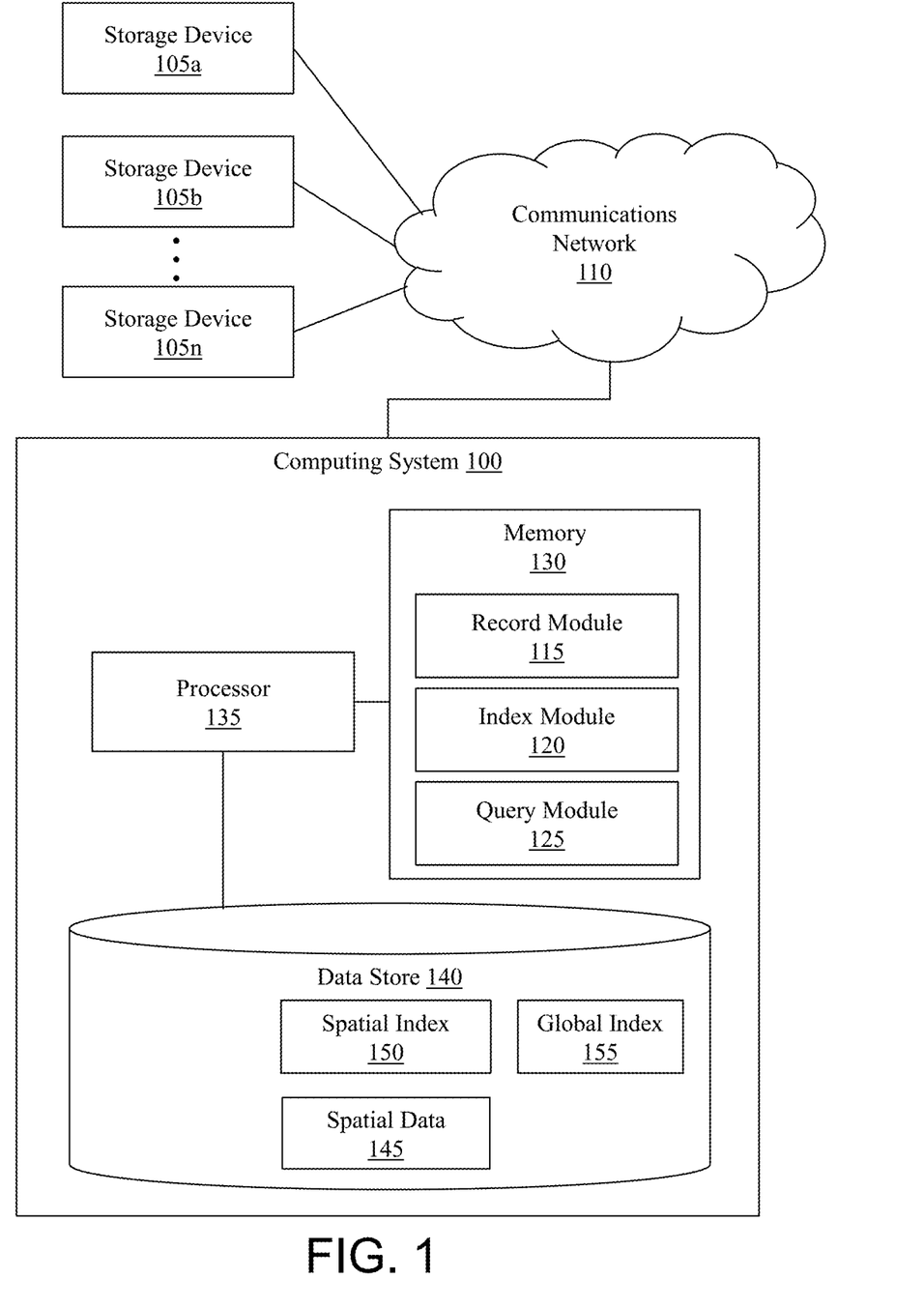
FIG. 1 illustrates one embodiment of a system associated with spatial indexing and querying using Resiliant Distributed Datasets.

With reference to the drawings, FIG. 1 illustrates one embodiment of a computing system 100 related to spatial indexes for spatial data stored in a distributed file system. In one embodiment, the computing system 100 is implemented as a computer 700 described in detail below with respect to FIG. 7. According to another embodiment, the computing system 100 is a computing/data processing system including an application or collection of distributed applications for enterprise organizations. The applications and computing system 100 may be configured to operate with or be implemented as a cloud-based networking system, a software as a service (SaaS) architecture, a node in a cluster computing system or another type of networked computing solution. In one embodiment, the computing system 100 is a centralized server-side application that provides at least the computerized functions disclosed herein and that electronically communicates with a plurality of nodes (e.g., storage devices 105a, b . . . n) over a computer communications network 110.

The storage devices 105a, 105b through 105n (also referred to as mappers herein) in combination with the computing system 100 form a distributed file system. In other words, the computing system 100 and the storage devices 105a, 105b through 105n operate together to store data. The computing system 100, in one embodiment, is a master node that controls other nodes (e.g., devices 105a-n) of the distributed file system.

In one embodiment, the distributed file system can be a Hadoop distributed file system (HDFS) that stores spatial data. Accordingly, the devices in the distributed file system act together to store the spatial data (e.g., spatial data 145). Additionally, computing system 100 may cooperate with device 105a-n to split and process the spatial data 145 in parallel, as will be discussed in greater detail subsequently. Consequently, in one embodiment, the storage devices 105a, 105b through 105n are configured with components similar to computing device components illustrated as part of the computing system 100 as shown in FIG. 1.

For example, one or more of the components of the computing system 100 can be embodied as program modules (Record module 115, Index module 120, Query Module 125) stored in a memory 130 of the computing system 100. The program modules are configured with instructions that, when executed by at least a processor 135, cause the computing system 100 to perform the corresponding function(s) as described herein.

The processor 135 is, for example, a hardware processing unit, such as, a microprocessor, central processing unit (CPU), application-specific integrated circuit (ASIC), or similar hardware device that is specially configured with the modules of the present system. The processor 135 is connected via circuitry (e.g., a bus) to the memory 130 and to the data store 135 via one or more input/output controllers. The memory 130 is, for example, a non-transitory memory such as a cache memory of a processor, a flash memory, a random access memory (RAM), or another memory that stores instructions executed by the processor 135 that comprise the record module 115, the index module 120 and the query module 125.

Similarly, the data store 140 is, for example, a random access memory (RAM), flash memory, hard-disk drive or similar volatile or non-volatile computer-storage media. Accordingly, the processor 135 uses the data store 140 and/or the memory 130 to store various data when performing the disclosed functions. As shown in FIG. 1, the data store 140 is integrated with the computing system 100. Of course, in other embodiments, the data store 140 is implemented as a distributed storage that is shared among the devices 105a-n and the computing system 100 of the distributed file system.

The data store 140 stores the spatial data 145 and a spatial index 150 and a global index 155. As previously discussed, the spatial data 145 is data that describes elements in a spatial coordinate system. The spatial coordinate system may be a geographic coordinate system (e.g., longitude and latitude), a computer-based modeling or rendering coordinate system (e.g., Cartesian coordinates), and so on. As used herein, the spatial data 145 relates to spatial data of any format, such as GeoJSON, Esri Shapefile, etc. The spatial data can represent images (i.e., satellite photos, aerial photos, etc.) with rows and columns of pixels that depict information graphically, information defining different geometries (i.e., points, lines, polygons) that together represent elements (e.g., roads, rivers, political boundaries, etc.) in the spatial coordinate system, and the like.

As noted above, a RDD is a distributed collection of data structures stored by a computer-memory or other non-transitory data storage of different storage devices 105a-105n. The RDD is a distributed memory abstraction that allows in-memory computations to be performed on large clusters in a fault-tolerant manner. The RDD construct can be implemented to form the core data structure of parallel and distributed computing frameworks such as Apache Spark, for example.

Among the features of the RDD utilized by the present technology are:

(i) The distributed nature of spatial data: RDD's data is distributed across the communication network 110 in partitions. Each partition contains a subset of the RDD's data and can be processed independently by a node (e.g., storage devices 105a, b . . . n) over the computer communications network 110 in clusters.

(ii) Data resiliency: The resiliency of the RDD provides the RDD with a fault-tolerant capability. An RDD can be evaluated at any moment thanks to a lineage graph, which contains all the transformations needed to get the current RDD's data. The lineage graph is also called an RDD dependency graph, which is a graph of all the parent RDDs of an RDD. It is built as a result of applying transformations to the RDD and creates a logical execution plan. An RDD can be viewed as a series of chained transformations over one or more data sets. Performing the series of chained transformations on the data sets allows the RDD to be reconstructed, as needed. Thus lineage graph information is used to compute each RDD on demand, so that whenever a part of persistent RDD is lost, the data that is lost can be recovered using the lineage graph information.

(iii) Lazy evaluation: With the lazy evaluation feature, data generated by the RDD is not calculated until a defined action is executed. An RDD can be generated from previous transformations over other RDDs, but the lazy evaluation algorithm prevents evaluation of an individual RDD until the action is executed.

(iv) Partitioned data: Distributed computing frameworks such as Spark process spatial data in the RDD on a per-partition basis. In other words, a distributed task is created and executed for processing the data in each data partition defined for or assigned to the distributed task.

Distributed Spatial Indexing Embodiment

A spatial index is a data structure used to optimize queries of spatial data, and can be implemented as an R-Tree or a Quad Tree, for example. These so-called "tree" data structures or "tree" indexes can be utilized to map multidimensional data, such as data arranged within a cartesian or other coordinate system in at least two dimensions, for example.

Figure 2:
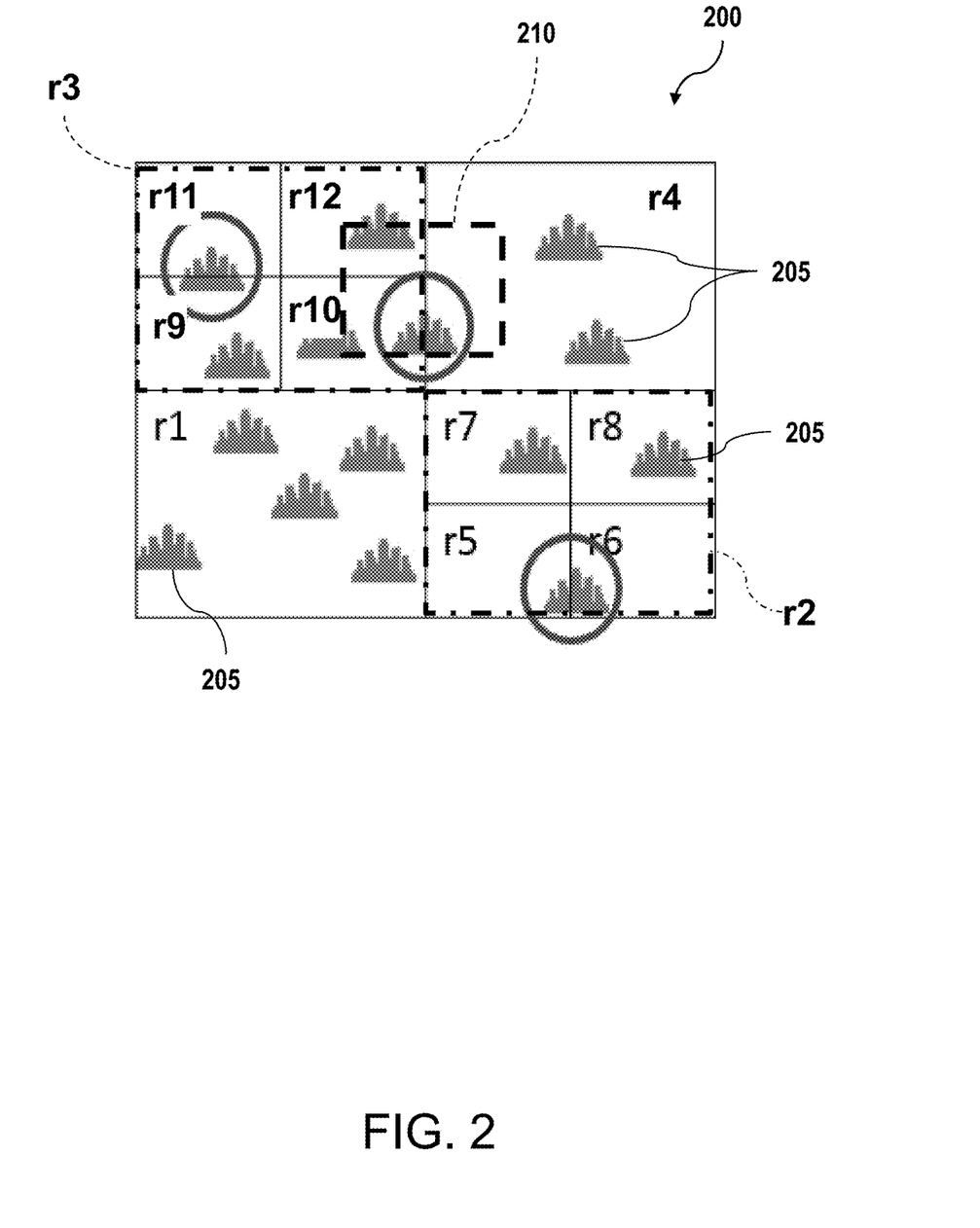
FIG. 2 illustrates an example of a data space divided into spatial regions containing spatial data.

With reference to FIG. 2, an illustrative embodiment of a spatial data space 200 containing spatial data 205 included in a RDD to be indexed is shown. The spatial data 205 is represented by a graphical image (e.g., an icon) for explanatory purposes and is shown in multiple instances throughout the data space 200. Each instance is a different set of data in the data space 200. Reference to "data 205" herein typically refers to all the data within the spatial data space 200 unless stated otherwise. In response to receiving a query that requests a selected set of spatial data from the data space 200, a query window 210 is defined and/or selected to identify what data region is being searched. The scope of the query is to locate data 205 within a portion of the data space 200 within the query window 210. The query window 210 is represented in FIG. 2 by a rectangle 210 defined by dashed lines. A typical spatial query requests all objects that lie within a query window, that is, a defined geometry or fence (e.g., rectangular window 210). A dynamic query window refers to a geometric area that is not defined in the database, but is defined before it is used in a search query and applied to the spatial data space 200. According to one embodiment, to improve the efficiency, speed, and consumption of computational resources to complete the query, the index module 120 indexes the data 205 throughout the data space 200 using a tree index as follows:

Recursive data space division: The data space 200 encompassing the data 205 included in the RDD is recursively segmented by the record module 115 into regions shown in FIG. 2 as rectangles labeled as regions "r1, r2, r3 . . . ." For example, the record module 115 divides the data space 205 in smaller rectangular regions. Bigger regions such as r2 point to or contain smaller regions r5, r6, r7, r8 and ultimately, the smallest regions (which become the tree leaf nodes) are related to the actual data 205 at that location. These regions will correspond to nodes in the tree structure as explained below. The regions in effect divide the search space 200 into sub-spaces that become separate partitions of data. In one embodiment, the record module 115 divides the data 205 from the entire data space 200, and can distribute the divided data 205 to separate storage devices 105a-n (shown in FIG. 1) to be stored and be accessible over the communications network 110 to form the RDD.

The leaf nodes are the smallest spatial regions within the data space 200 that contain the actual data 205 of the RDD, and have spatial coordinates within the data space 200. For example, embodiments of the leaf nodes include rectangular regions that each constitute a portion of the data space 200, but less than all of the data space 200, and have latitudinal and longitudinal coordinates that identify the location of the corresponding data.

A plurality of the leaf nodes can be contained within a larger, secondary node, such as node r2 and node r3, for example. The secondary node r2 contains leaf nodes r5, r6, r7, r8, and the secondary node r3 contains leaf nodes r9, r10, r11, r12. A plurality of the secondary nodes can optionally be contained within an even larger, tertiary node, and so on. For the sake of brevity and clarity, however, the present disclosure describes leaf nodes r5, r6, r7, and r8 contained within the secondary node r2, and the leaf nodes r9, r10, r11, and r12 contained within the secondary node r3 as an example.

Data 205 that spatially lies over, or is contained within a region of the data space 200 is mapped to the leaf nodes corresponding to that region. The geometries represented by the data 205 may span more than one region, and if so are mapped to the nodes representing each of the regions. For example in FIG. 2, regions r5 and r6 have overlapping data (data icon is in both regions and is circled); regions r4 and r10 have overlapping data identified by the circled data icon; and regions r9 and r11 have overlapping data identified by the circled data icon. This is represented by the data icon 205 being in both regions.

Figure 3:
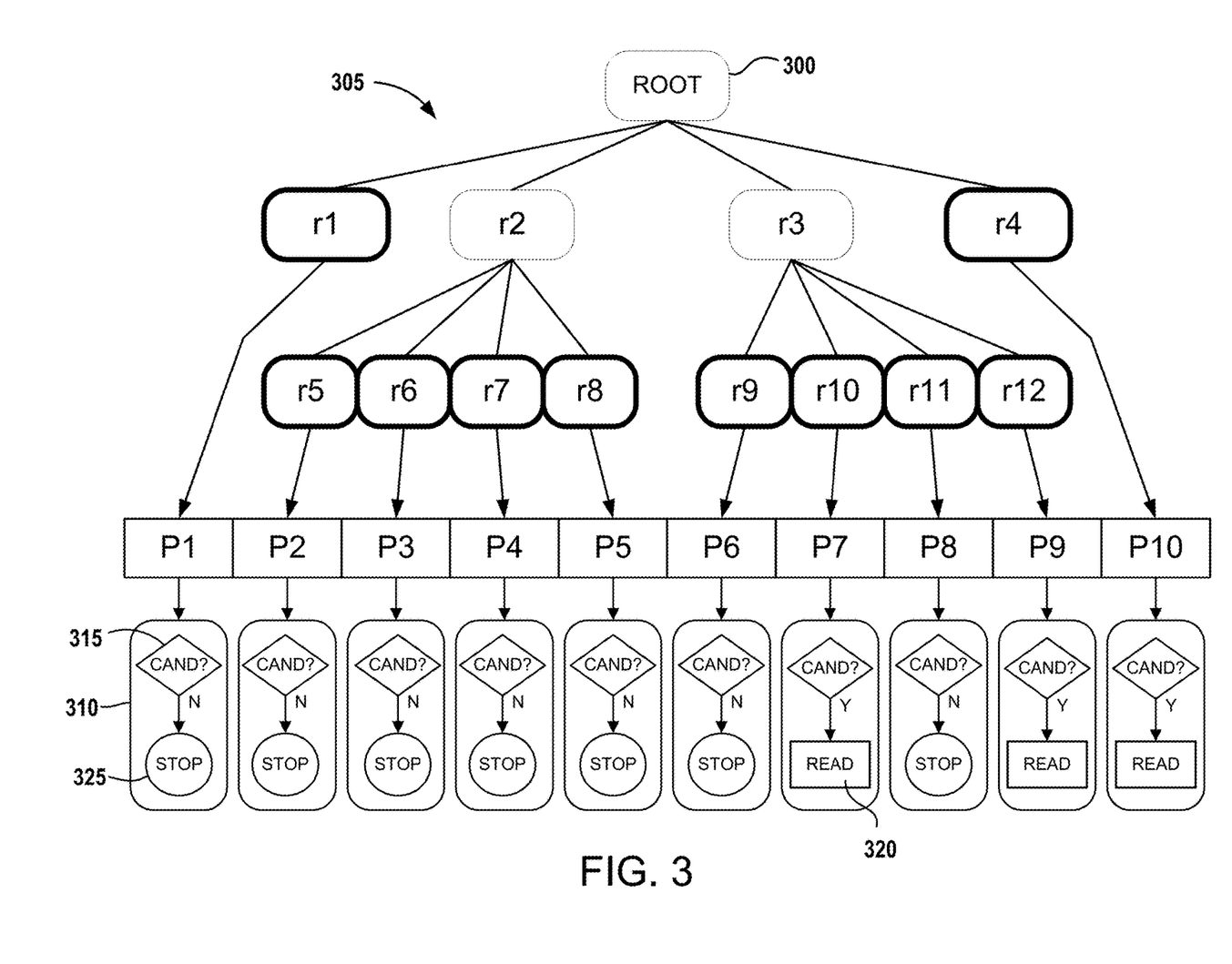
FIG. 3 illustrates one example of an inefficient spatial indexing and querying technique that launches a distributed function for each partition of a Resiliant Distributed Dataset.

The spatial layout and regions of the data space 200 of FIG. 2 are indexed using a Quad Tree shown in FIG. 3. The Quad Tree 305 is created as a tree structure with nodes that represent the various partitioned regions of the data space 205. Each region is a rectangle and has spatial coordinates. A node may have nested regions (root, r2, r3) or actual data (leaf nodes). The entire data space 200 corresponds to root node 300 of the Quad tree 305 shown in FIG. 3. A Quad tree is an example of a tree data structure in which each internal node has exactly four children. Quad-trees can be used to partition a two-dimensional space by recursively subdividing it into four quadrants or regions. The data associated with a leaf node cell varies by application, but the leaf cell represents a unit of interesting spatial information. For the data space 200, the leaf nodes containing the data 205 are outlined in bold, and designated by r1, r4, r5, r6, r7, r8, r9, r10, r11 and r12. The leaf nodes r1, r4, r5, r6, r7, r8, r9, r10, r11 and r12 constitute all of the smallest regions within the data space 200 that contain data 205, regardless of whether that data 205 falls within the query window 210.

Each leaf node is mapped to a different distributed partition P1-P10. For example, leaf node r1 is mapped to partition P1; leaf node r5 is mapped to partition P2; leaf node r6 is mapped to partition P3, and so on to leaf node r4 is mapped to partition P10. As noted above, each partition contains a subset of the RDD's data 205, and can be processed independently by one or more of the storage devices 105a-n forming nodes of the cluster.

An example of a prior technique that performs an inefficient query of the data 205 represented by the Quad tree 305 in FIG. 3 involves locally executing a search to identify, from the Quad tree 305, all of the RDD partitions P1-P10 that overlap/interact with the query window 210. Each partition P1-P10 that is identified as containing data 205 falling within or spatially intersecting with the query window 210 interacts with the query window 210, and is referred to herein as a "candidate partition." Thus in FIG. 2, regions r4, r10, and r12 interact with the query window 210, which means their associated mapped partitions P7, P9, and P10 are the candidate partitions for the search query window 210. This means that the potential data results of the search query window 210 will be found in the candidate partitions P7, P9, and P10. The other non-candidate partitions will not contain any potential search results since these partitions are outside the scope/range of the search query window 210. In other words, the non-candidate partitions do not contain data that spatially intersects/overlaps with the search query window 210.

In the prior technique, the inefficient query continues by executing a set of distributed functions (distributed tasks), each one represented by one block 310, which are executed by the storage devices 105a-n corresponding to the partitions P1-P10. Each partition is processed by creating and executing a distributed function 310 for a partition in a one-to-one relationship. Although one distributed function 310 is labeled in FIG. 3, each corresponding block under the partitions P1-P10 represents one distributed function 310. Thus for the ten partitions P1-P10 there are ten distributed functions 310 that are created and executed to process the data of the corresponding partition.

With continued reference to FIG. 3 and the inefficient query technique, for each RDD partition P1-P10, the respective storage device 105a-n executes an associated distributed function 310 and determines, at decision block "CAND?" 315, whether the partition is a candidate partition. As previously stated, a candidate partition is a partition that stores data 205 contained within the query window 210 that may be potential search results. Typically, if any data in a partition spatially intersects/overlaps with the query window, then the partition is a candidate partition. For partitions P1-P10 that are determined to be candidate partitions at 315, the respective storage devices 105a-n read and iterate over the candidate partitions' contents at "READ" blocks 320, and find records interacting with the query window 210. Based on the query window 210 in FIG. 2, the candidate partitions in this example are partitions P7, P9 and P10, which are mapped to regions r10, r12 and r4, respectively, as those regions contain the data 205 within the query window 210 (see FIG. 2). Thus for partitions P7, P9, and P10, a "READ" function 320 is performed to read the data in those partitions. For partitions P1-P10 that are found not to be candidate partitions at 315, the respective distributed functions 310 are terminated at "STOP" 325, and the respective partitions are disregarded for the remainder of the query.

This illustrative query process is inefficient because the distributed functions 310 are created and executed for all partitions P1-P10, even those non-candidate partitions that are not mapped to partitions that interact with the query window 210. Although the time and computational resources consumed by each distributed function 310 may be relatively small, the time and computer burden to create and execute each distributed function/task becomes large for large RDDs, with many partitions (e.g., hundreds, thousands, or more). Each distributed function is overhead to the computing system and uses processing time and resources. This burden and overhead becomes even greater when data 205 spans more than one of the regions r1-r12 of the data space 200, requiring additional distributed functions 310 to be executed to remove duplicate results.

In an effort to improve the efficiency of a search for RDD data, the present technology filters the partitions P1-P10 in advance before the distributed functions 310 are created and executed. The filtering excludes partitions that are not candidate partitions and the filtered non-candidate partitions are not passed along in the execution process to the next step of performing the distributed functions. As a result, execution of distributed functions is limited to the candidate partitions. Thus distributed functions are executed only for the candidate partitions because only candidate partitions are passed/transmitted for further search processing in an intermediate search RDD (described below). Many distributed functions are avoided (because they are not executed) for partitions that are non-candidate partitions because the non-candidate partitions are filtered and thus are not passed/transmitted to the next execution step. Thus a distributed function 310 is neither created or nor executed for all of the many non-candidate partitions thereby suppressing and avoiding unnecessary execution.

Figure 4:
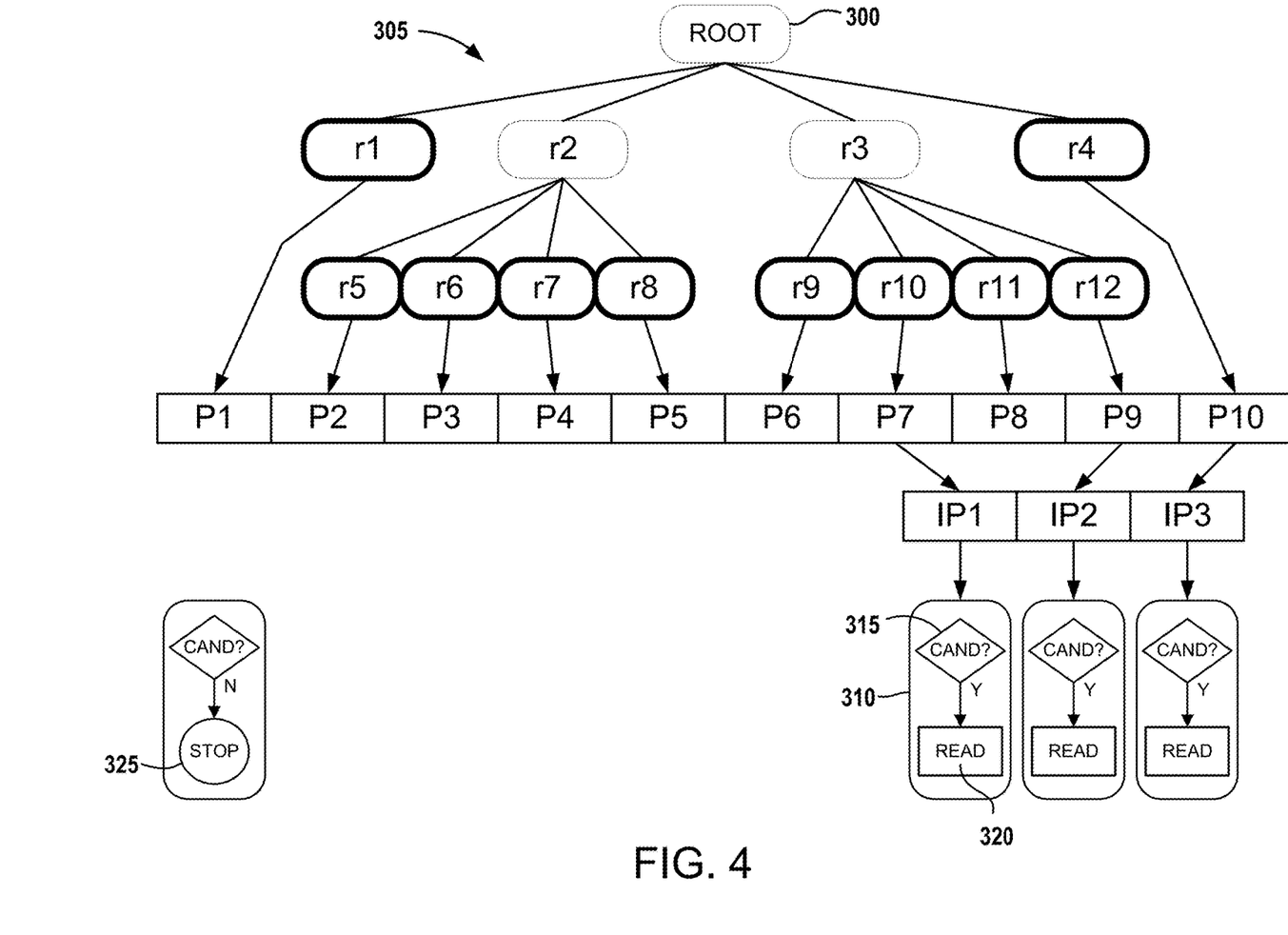
FIG. 4 illustrates an embodiment of a technique that involves creating partitions of an intermediate search Resiliant Distributed Dataset including only candidate partitions that contain data within a query window, and limiting execution of distributed functions to the candidate partitions of the intermediate search Resiliant Distributed Dataset.

With reference to FIG. 4, in one embodiment, the present filtering mechanism is implemented by generating an intermediate search RDD limited to only the candidate partitions. This in turn limits the execution of distributed functions to only the candidate partitions. For example, the intermediate search RDD is created after the source RDD (which contains all the partitions P1-P10) and prior to the execution of the distributed function blocks 310. In FIG. 4, the intermediate search RDD is represented as an intermediate partition dataset including partitions IP1, IP2, and IP3, which are assigned from only the candidate partitions P7, P9, and P10. The intermediate search RDD is created using RDD's lazy evaluation feature, which requires a partition P1-P10 to be a candidate partition as a condition for reading and iterating, or otherwise evaluating those candidate partitions. Thus, the intermediate search RDD is quickly derived from the source RDD (partitions P1-P10) by only mapping candidate partitions (e.g., partitions P7, P9, P10) from the source RDD to the intermediate RDD so no other transformation is required.

The intermediate search RDD is created as a transformation of the RDD with partitions P1-P10. As lazy evaluation is used, no data 205 is read or processed at this point. Only the intermediate search RDD specification is created. The intermediate search RDD specification is used by the Spark distributed framework to create a path of transformations from the origin RDDs to final RDD and thus, apply optimizations by removing fruitless paths in the RDD transformation hierarchy.

The intermediate search RDD specification contains the RDD with partitions P1-P10 as its source or parent RDD (e.g., source RDD) and the intermediate partitions IP1-IP3 as the resulting partitions based on only the candidate partitions P7, P9, and P10 in this example. Note that at this point it is only required to specify the number and/or ids of the resulting partitions as the content of such partitions will be evaluated later when the RDD needs to be materialized.

Intermediate search RDD's resulting partitions IP1-IP3 are defined from the list of candidate partitions for the search query window 210 which are a subset of the RDD partitions P1-P10. In the current search, candidate partitions P7, P9 and P10 from the parent RDD are mapped to partitions IP1, IP2 and, IP3 from the intermediate search RDD.

When data needs to be materialized, because results are required to be displayed, saved or, used in another computation, the Spark framework requests the intermediate search RDD to compute its partitions by calling its compute( ) method and passing a partition id which in this case can be IP1, IP2 and, IP3. When this happens the intermediate search RDD falls down to its ancestor RDD by invoking the ancestor's same compute( )method with the equivalent partitions ids, for example partition IP1 is passed as P7, IP2 as P9 and, IP3 as P10.

For example, FIG. 4 shows the same Quad tree appearing in FIG. 3, which is based on the data space 200 of FIG. 2 containing the data 205 and the query window 210. Unnecessary distributed functions 310 are avoided by using an intermediate search RDD containing intermediate partitions IP1-IP3. To generate the intermediate search RDD, only the candidate partitions among the partitions P1-P10 are mapped to the intermediate partitions IP1-IP3 of the intermediate search RDD using the lazy evaluation function. In other words, if a partition P1-P10 is a candidate partition, the candidate partition is mapped to an intermediate partition (e.g., candidate partitions P7, P9, and P10 are mapped to IP1, IP2, and IP3). As seen in FIG.4, non-candidate partitions P1-P6 and P8 are not mapped to an intermediate partition. Thus the non-candidate partitions are dropped/filtered from further processing and no distributed functions 310 are created for the non-candidate partitions.

After the intermediate search RDD is created which in this example includes three partitions IP1-IP3, the distributed functions 310 are created and executed only for each of the intermediate partitions IP1-IP3 as seen in FIG. 4 by the three distributed function blocks 310 (one block for each intermediate partition). As also seen in FIG. 4, the intermediate partitions correspond to partitions P7, P9, and P10, which in turn correspond to the candidate regions r9, r10, and r4 that overlap with the search query window 210 as explained previously.

Because all of the intermediate partitions IP1-IP3 in the intermediate search RDD are candidate partitions, the number of distributed functions 310 executed is minimized to the number of candidate partitions. Accordingly, the number of reads, iterations and evaluations performed as part of the distributed functions 310 is minimized, easing the time and computational requirements of the query. The distributed functions 310 required as part of the inefficient query example described above to evaluate and exclude partitions P1-P10 that are not candidate partitions are avoided.

Removing Duplicate Record Results

Another source of inefficiency of spatial search structures such as Quad-trees and R-trees is the duplication of data 205 (e.g. data records) which spatially spans more than one partition P1-P10. For example, when a data record spans/overlaps over two partitions, a copy of the data record will appear in both partitions, thus being duplicated. An inefficient solution to minimize processing of duplicate data 205 is to perform an additional, dedicated duplicate-removal step after the evaluation of candidate partitions as part of the distributed functions 310 described above. For large RDD's, however, a single iteration to process all partition data can be costly in terms of time and computational resources to determine whether two records in different candidate partitions are the same. Furthermore, detecting duplicate records may imply knowing a way to differentiate records such as an ID field or a mechanism to compare the record's contents to check if two records are the same.

An embodiment of efficiently removing duplicate records includes creating a record partition list for a record that spans more than one partition/region r1-r12 of the data space 200 as part of the spatial-indexing process. Duplicate records are filtered based on an identifier assigned to each duplicate record on the list. In one embodiment, the record partition list for a record identifies the partition ID of all the partitions that the record appears in. The record partition list will then be used in a record filtering technique described below.

When a portion of the data 205, such as a record for example, is duplicated across multiple partitions P1-P10, each record replica will contain an identifier of the partitions P1-P10 containing such record. For example in FIG. 2, there is data 205 that overlaps both regions r4 and r10. Thus the corresponding partitions P7 and P10 (see FIG. 3) will contain duplicate data records from the overlapping data. However, because any of the record replicas can be returned by the query, it is unnecessary to evaluate every partition P1-P10 that contains one of the record replicas. The search results only need to find and return one copy of the record from one partition. Retrieving a copy of the same record multiple times from different partitions is inefficient. An embodiment of minimizing the number of candidate partitions includes filtering all but one record retrieval step from one of the candidate partitions that contains the duplicate record.

When a record is duplicated across multiple partitions, each record replica will contain the ID of the partitions containing such record in its record partition list. For each record, a list of partition identifiers (IDs) is created that contain the record. However, it is not needed that each replica of the record contains the IDs of all the partitions where it is replicated. Filtering of the lists can be performed based on a number of other candidate partitions referenced in each of the record replicas. For example, only the record laying in the partition with the higher ID number contains the list of the partitions with lower ID numbers. So the next record with the next highest ID number will contain one ID less in its list and so on until the record in the partition with the minimum ID number (lowest ID number) will contain zero ID elements in its list.

As a specific example, a candidate partition with the greatest identification number containing a record replica also contains a list of all the other candidate partitions having identification numbers that are less than the greatest identification number. The candidate partition containing the record replica with the second highest identification number will contain one less identification number on its list, as the candidate partition with the record replica having the highest identification number is omitted. This trend continues until the candidate partition containing with the lowest identification number contains zero other identification numbers of other candidate partitions on its list.

To illustrate, consider a record X that spans partitions having identification numbers P2, P3 and P5. In this list, P5 is the highest ID number and P2 is the lowest. Because the record X can be retrieved from any of these candidate partitions, it is unnecessary and inefficient to include all of the candidate partitions having identification numbers P2, P3 and P5 solely for retrieving the record X. Record X only needs to be retrieved once from one partition to satisfy the query. Of course, there may be another record encompassed by the query window 210 that justifies keeping more than one of the candidate partitions with identification numbers P2, P3 and P5 among the candidate partitions to be filtered into the intermediate search RDD as described herein. However, if record X is the only record that warrants keeping the candidate partitions having the identification numbers P2, P3 and P5, then it is only necessary to keep one of the candidate partitions for processing.

The process of removing duplicated records occurs before a record is about to be spatially filtered in a distributed spatial search. A record is eligible to be part of the result only if it belongs to the candidate partition with the minimum (lowest) ID number in the current spatial search. The example below describes this scenario better.

A spatial search is performed based on a query window and using the spatial index it is determined that the candidate partitions for the current query window are partitions P3, P4 and P5. Suppose there is a record X which spans/overlaps partitions P2, P3, and P5, which causes the record X to be duplicated in each of those partitions. The present system creates a record partition list for records that are duplicated in multiple partitions according to a filtering technique below. For record X in each partition in which the record is duplicated, for example, as shown in the following Table 1, the record partition list identifies each partition ID that the record spans as follows:

TABLE 1

| RECORD REPLICA | SPANNED PARTITION(S) |
| --- | --- |
| Record X, Partition P5 | P3 and P2 |
| Record X, Partition P3 | P2 |
| Record X, Partition P2 | Null |

In one embodiment, the duplicated record X has an associated record partition list in each partition. As seen in the table, the record partition list in Partition P5 shows that Record X is in Partition 5 and also spans in (overlaps in) lower partition IDs for Partitions P3 and P2. In Partition P3, the record partition list shows that Record X is in P3 and also in P2. Partition P5 (a higher ID number than P3) is not included in that list and is filtered out or otherwise removed from the list. This technique filters/removes the higher partition IDs (relatively-higher number) from the current record partition list. In Partition P2, Record X is in P2 but no other partitions are listed since P2 is the lowest ID in the list for Record X and thus the higher partition IDs have been removed. In another embodiment, partition IDs can be stored in a reverse order from low to high numbers.

Record replica filtering can occur before a record is to be spatially filtered in a distributed spatial search. According to one embodiment, record X is eligible to be part of the result if it belongs to the candidate partition with the lowest identification number among the candidate partitions for the current spatial search. Using the example above, consider the spatial search query where the candidate partitions are P3, P4, and P5. Duplicate records are removed/filtered using the record partition lists for record X shown above and with reference to FIG. 5.

Figure 5:
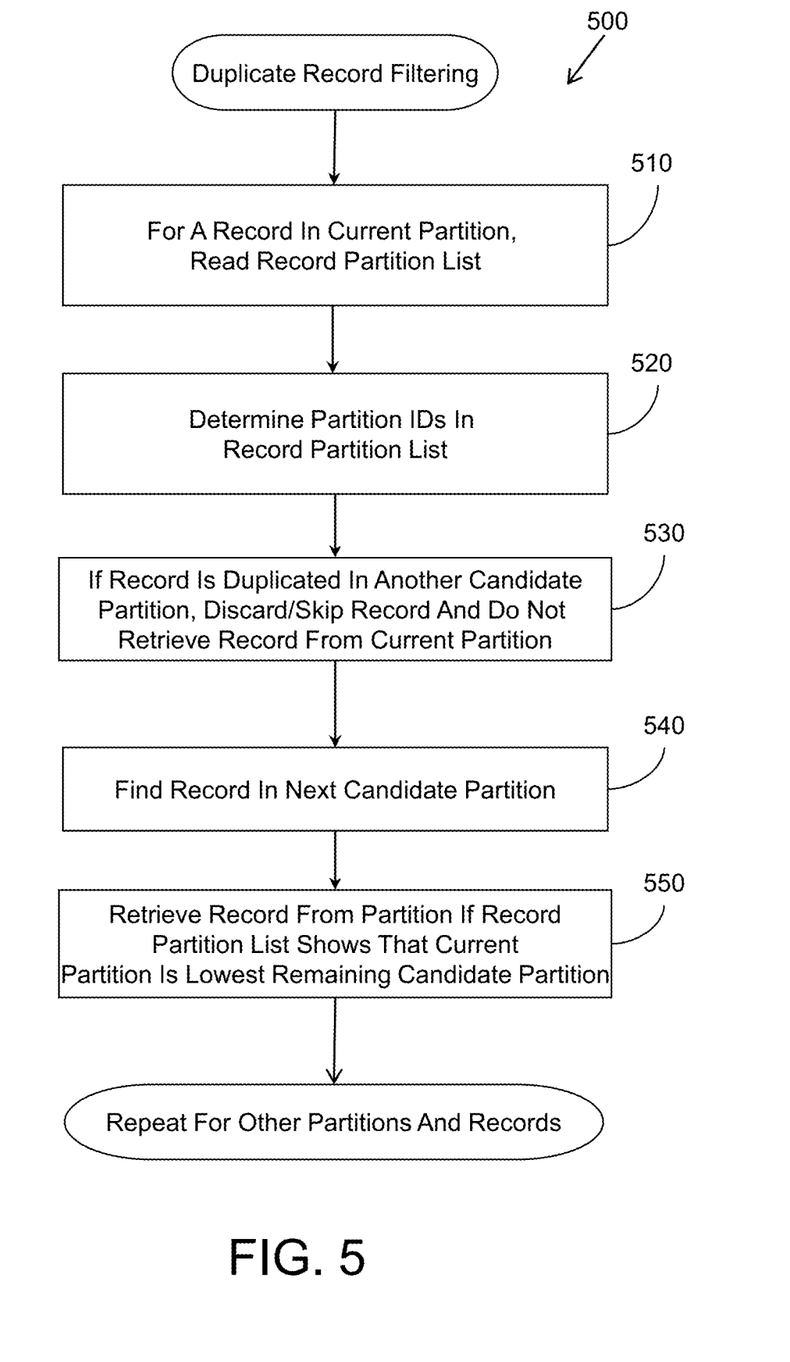
FIG. 5 illustrates one embodiment of a method for filtering duplicate records from partitions.

With reference to FIG. 5, one embodiment of a duplicate record filtering method 500 is shown, which uses the above example. For the spatial search returning the record replicas tabulated above, assume the candidate partitions for the current query window are P3, P4 and P5, and record X spans partitions P2, P3, and P5. At 510, the partitions are processed and a current partition, partition P5, is processed and the record X is found. The record partition list is read and the partition IDs are determined for record X at 520. The list shows that record X is duplicated in P5, P3, and P2 (based on the above example). At 530, the process determines if the record X is duplicated in another candidate partition, and if so, the process discards/skips the record X and does not retrieve record X from the current partition.

At this point, the record X is discarded/skipped as it contains in its list of spanned partitions the partitions P2 and P3 (meaning the record is duplicated in other partitions). Furthermore, one of those partitions P3 is also one of the candidate search partitions. Hence, the record X is contained in another candidate partition with a lower ID number. As such, record X can be retrieved from another partition (e.g., from P3 once P3 is processed). Thus record X is not retrieved from partition P5 thereby filtering record X and not executing a record retrieval step.

At 540, the method 500 continues to process partitions including partition P3, and record X is found again. The record partition list assigned to record X in partition P3 is analyzed. At 550, the process determines whether to retrieve the record X from partition P3 if the record partition list shows that the current partition P3 is the lowest remaining candidate partition for record X.

Record X is eligible to be returned as a query result from partition P3, and partition P3 is eligible to be included in the candidate partitions. Analyzing the record partition list in P3, record X also appears in partition P2. However in this case, record X is not filtered during the processing of P3 at this point but is retrieved. This is because although the record X is contained by a partition with a lower identification number (partition P2), that partition P2 is not encompassed by the search query window and thus is not a candidate partition. Recall that the candidate partitions include only partitions P3, P4 and P5 in this example. Thus P2 will not be processed in this search query, meaning that record X cannot be retrieved from P2.

Accordingly, based on record X, partition P3 is designated as a candidate partition and record X from partition P5 is filtered as being duplicative of the same record X in partition P3, even though partition P5 is within the query window of the present example. The record replica of partition P5 is eliminated from eligibility, or filtered, in favor of the record replica of partition P3 because the record replica of partition P3 is all of the following:

(i) is listed among the spanned candidate partitions in the record replica of partition P5 as including record X, (ii) is in a partition having an identification number (i.e., P3) that is lower than the identification number (i.e., P5) of partition P5, and (iii) is included within the search query window.

In general, this technique keeps track of the partitions containing a record and stores the minimum information (e.g., partition IDs) required to efficiently filter the duplicate records, minimizing the number of data record retrieval functions to be executed.

Independence of Underlying RDD Content Format

System/data compatibility improvements can also be realized by the present technology. Existing spatial frameworks for RDD's require data to be loaded from a known specific spatial data format such as GeoJSON, Esri Shapefile, etc., limiting the usefulness of such frameworks to data loaded from such well-known formats. Some frameworks require the data to already be in a columnar format and the spatial data to be in terms of their own specified data types. Thus, there is limited compatibility between frameworks, often requiring users with a different data format to transform the data first to one of the supported data formats.

Figure 6:
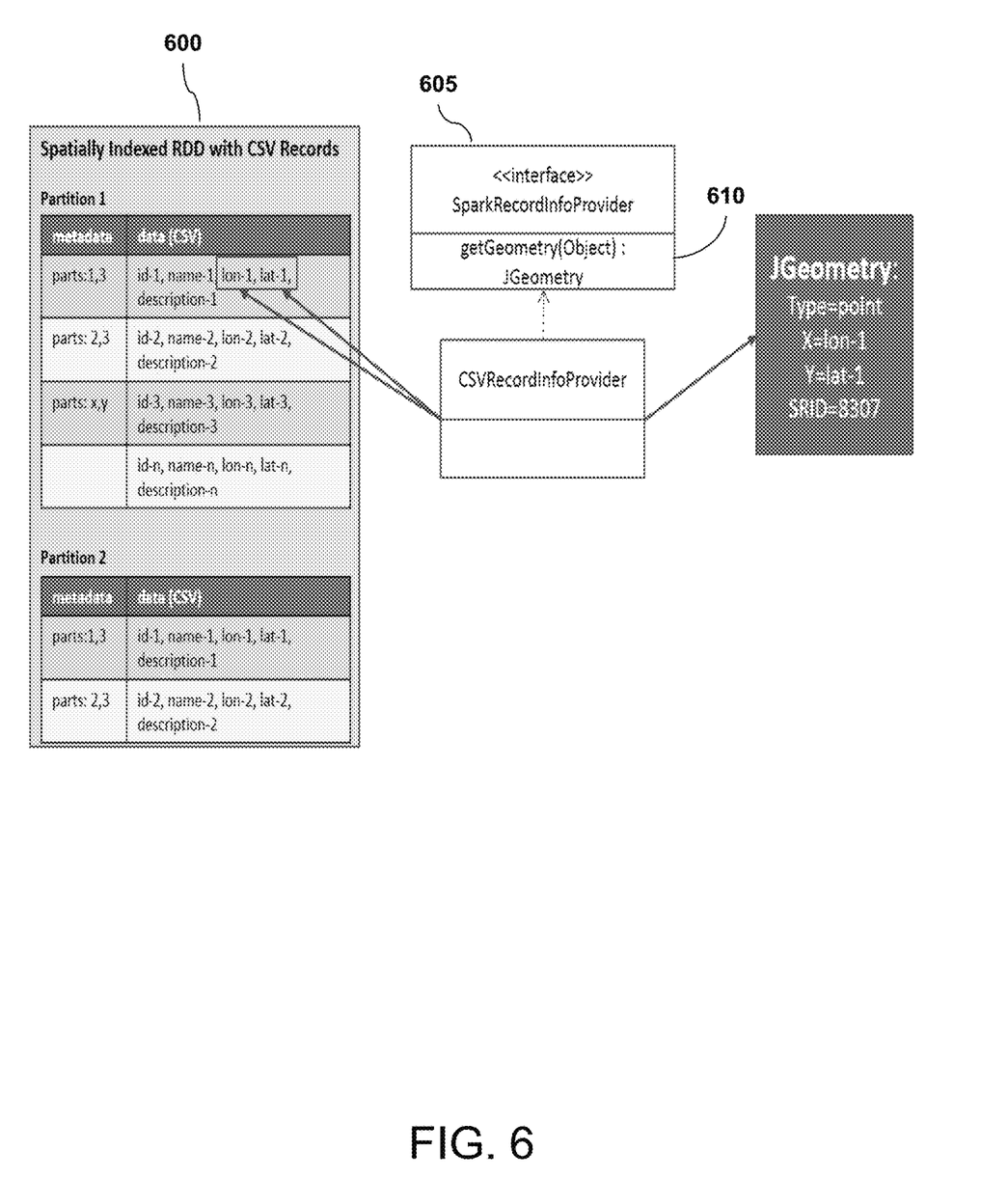
FIG. 6 illustrates an embodiment of extracting geometric data from one spatial data that is independent of a data format of the spatial data.

The spatial index technology of the present system is compatible with RDDs of a plurality of different data formats, allowing the data required to perform the processes described herein to be obtained independently of the data format. An interface, which abstracts the spatial information from the underlying data format, is utilized by the record module 115 to extract the required spatial data from the data 205.

An illustrative embodiment of a record 600 included in the data 205 is shown in FIG. 6. An example of the interface 605, referred to herein as SparkRecordInfoProvider, calls a process 510 referred to as getGeometry( ). The getGeometry( ) process is compatible to extract data from records compliant with any data format. The interface 605 is primarily tasked with extracting spatial information from the data record 600. In FIG. 6, the record is in a comma-separated-values ("CSV") format, from which SparkRecordInfoProvider evaluates and extracts the longitude ("lon") and latitude ("lat") fields to provide the spatial information as a common object used to represent geometries of the data 205.

As a result, spatial transformations such as filtering or spatial join, for example, can be applied to the data 205 of a plurality of different formats, without requiring transformation of those data formats into a specifically-supported data format. In other words, the original data format can be maintained since the spatial operations described herein can be performed with the SparkRecordInfoProvider-returned geometry data for each record. Further business rules can be applied to the filtered records using the original data format. In the previous example, the output of a spatial filtering would be records in CSV format.

Figure 7:
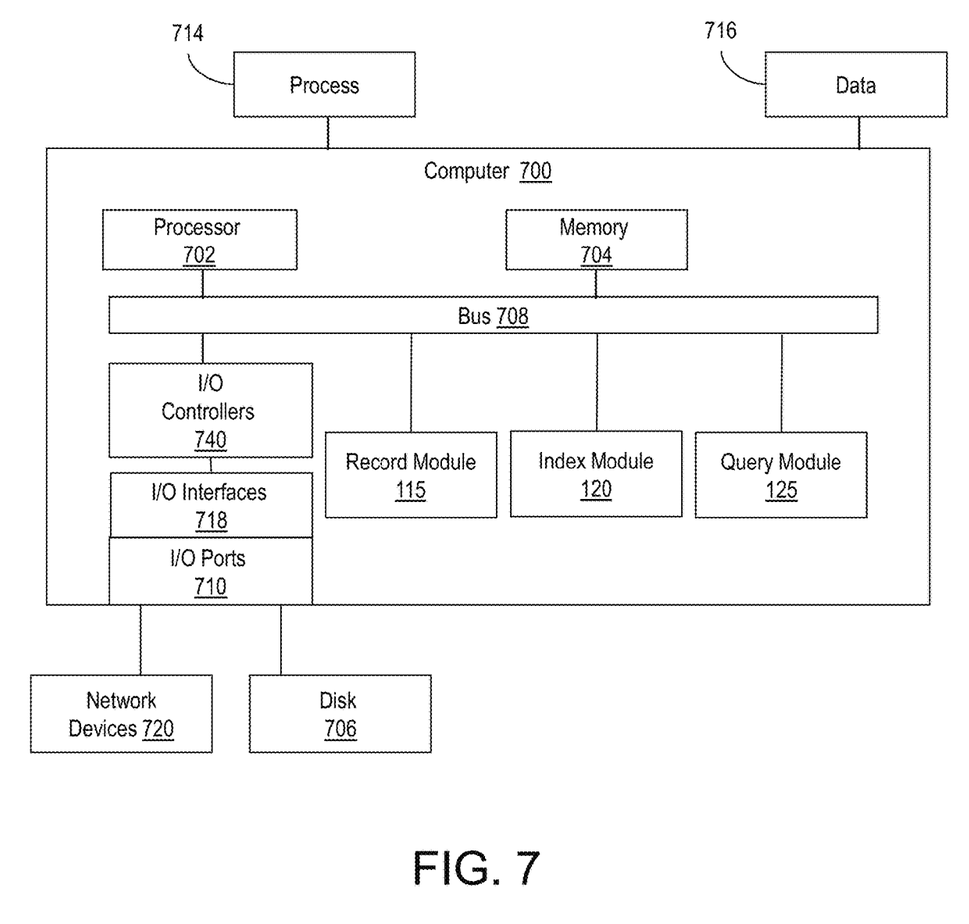
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 may include record module 115, index module 120, and query module 125, configured with logic to facilitate spatial indexing and the querying of spatial data similar to computing system 100 shown in FIG. 1. In different examples, the record module 115, index module 120, and query module 125 may be implemented in hardware, a non-transitory computer-readable medium with stored instructions, firmware, and/or combinations thereof. While the record module 115, index module 120, and query module 125 are illustrated as hardware components attached to the bus 708, it is to be appreciated that in other embodiments, the record module 115, index module 120, and/or query module 125 could be implemented in the processor 702, stored in memory 704, or stored in disk 706.

In one embodiment, logic 730 or the computer 700 is a means (e.g., structure: hardware, non-transitory computer-readable medium, firmware) for performing the actions described. In some embodiments, the computer 700 may be a server operating in a cloud computing system, a server configured in a Software as a Service (SaaS) architecture, a smartphone, laptop, tablet computing device, and so on.

The means may be implemented, for example, as an ASIC programmed to receive spatial data, parse the spatial data to extract metadata, generate index records and produce local indexes from the index records. The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for performing generating a global index of the local indexes that is useful for querying the spatial data in an efficient manner while avoiding redundant accesses to the spatial data.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output (I/O) interface (e.g., card, device) 718 and an input/output port 710, the operation of which are controlled by I/O controllers 740. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD-ROM, and so on. The memory 704 can store a process 714 and/or a data 716, for example. The disk 706 and/or the memory 704 can store an operating system that controls and allocates resources of the computer 700.

The computer 700 may interact with input/output (I/O) devices via the I/O interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer-executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium," as used herein, refers to a non-transitory medium that stores instructions and/or data configured to perform one or more of the disclosed functions when executed by at least a processor. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic," as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing computer-executable instructions that, when executed by a processor of a computing system, cause the computing system to:
   receive, by at least the processor, a query window defining a portion of a spatial data space to be queried for spatial data, wherein the spatial data space is partitioned into a plurality of partitions;
   identify, by at least the processor, candidate partitions in the plurality of partitions that contain the spatial data within the query window;
   create, by at least the processor, an intermediate partition dataset comprising only the identified candidate partitions;
   limit, by at least the processor, execution of a distributed function to the identified candidate partitions included in the intermediate partition dataset, wherein the distributed function processes at least one record in the candidate partitions of the intermediate partition dataset for inclusion in a result of the query;
   generate, by at least the processor, a data structure comprising the at least one record included in the result of the query; and
   return, by at least the processor, the data structure comprising the at least one record as the result of the query over a communication network.

2. The non-transitory computer-readable medium of claim 1, wherein the computing system creates the intermediate partition dataset by:
   mapping each of the candidate partitions from the plurality of partitions to the intermediate partition dataset; and
   excluding, from the intermediate partition dataset, partitions in the plurality of partitions that contain data spatially arranged outside of the query window.

3. The non-transitory computer-readable medium of claim 1 further comprising instructions that, when executed by the processor, causes the computing system to:
   for a data record in the spatial data space, generate a record partition list that identifies a list of partition identifiers from the plurality of partitions in which the data record is a duplicate record and appears as a record replica;
   wherein the record partition list is generated for the data record in each partition and wherein the list of partition identifiers for a current partition includes a sequence of partition identifiers minus a previous partition identifier that has a higher partition identifier;
   determine, by at least the processor, that the at least one data record spans a plurality of candidate partitions in the intermediate partition dataset based on at least the record partition list; and
   filter, by at least the processor, at least one of the duplicate records by avoiding to read the duplicate record from at least one of the partitions in the record partition list to avoid inclusion of a record replica in the intermediate partition dataset.

4. The non-transitory computer-readable medium of claim 3, wherein the at least one of the plurality of candidate partitions containing the record replica is filtered from the intermediate partition dataset based on a partition identifier assigned to each of the candidate partitions containing the record replica.

5. The non-transitory computer-readable medium of claim 4, wherein the at least one of the plurality of candidate partitions containing the record replica that is filtered from the intermediate partition dataset comprises a relatively-high partition identifier, that is greater than a relatively-low partition identifier assigned to one of the candidate partitions that is included in the intermediate partition dataset.

6. The non-transitory computer-readable medium of claim 1 further comprising instructions that, when executed by the processor, causes the computing system to:
   launch, by at least the processor, an interface that extracts and abstracts geometric data from spatial data compliant with a plurality of different data formats; and
   applies, by at least the processor, a spatial transformation to the geometric data extracted and abstracted from the data.

7. The non-transitory computer-readable medium of claim 1, wherein the instructions stored on the computer-readable medium, when executed by the processor, further cause the computing system to:
   map, by at least the processor, regions of the data space containing data with leaf nodes of a spatial index tree, wherein the intermediate partition dataset is created by:
   mapping leaf nodes associated with regions that contain the spatial data within the query window to the candidate partitions in the intermediate partition dataset, and excluding from the intermediate partition dataset leaf nodes associated with regions of the data space that contain data located outside of the query window.

8. The non-transitory computer-readable medium of claim 1, wherein the plurality of partitions of the spatial data space is structured as a data tree.

9. The non-transitory computer-readable medium of claim 8, wherein the data tree is a Quad tree.

10. A computing system, comprising:
    at least one processor connected to at least one memory;
    a query module stored on a non-transitory computer readable medium and including instructions that when executed by at least the processor cause the processor to receive a query window defining a portion of a spatial data space to be queried for spatial data, wherein a source resilient distributed dataset (source RDD) has been created that partitions the spatial data space; and an index module stored on a non-transitory computer readable medium and including instructions that when executed by at least the processor cause the processor to:
identify, by at least the processor, candidate partitions in the source RDD that contain the spatial data within the query window;
create, by at least the processor, an intermediate search resilient distributed dataset (IRDD) comprising each of the identified candidate partitions;
limit, by at least the processor, execution of a distributed function to the identified candidate partitions included in the IRDD, wherein the distributed function processes at least one record in the candidate partitions of the IRDD for inclusion in a result of the query;
generate, by at least the processor, a data structure comprising the at least one record included in the result of the query; and
return the data structure comprising the at least one record as the result of the query over a communication network.

11. The computing system of claim 10, wherein the index module creates the IRDD by:
mapping each of the candidate partitions from the source RDD to the IRDD; and
excluding, from the IRDD, partitions in the source RDD that contain data spatially arranged outside of the query window.

12. The computing system of claim 10, wherein the index module further comprises instructions that, when executed by the processor, causes the computing system to:
determine, by at least the processor, that the at least one record spans a plurality of candidate partitions in the IRDD; and
filter, by at least the processor, at least one of the plurality of candidate partitions containing the record from the IRDD to avoid inclusion of a record replica in the IRDD.

13. The computing system of claim 12, wherein the index module filters at least one of the plurality of candidate partitions containing the record replica from the IRDD based on a partition identifier assigned to each of the candidate partitions containing the record.

14. The computing system of claim 13, wherein the at least one of the plurality of candidate partitions containing the record replica that is filtered from the IRDD comprises a relatively-high partition identifier, that is greater than a relatively-low partition identifier assigned to one of the candidate partitions that is included in the IRDD.

15. The computing system of claim 10 further comprising a record module stored on a non-transitory computer readable medium and including instructions that when executed by at least the processor cause the processor to:
launch an interface that extracts and abstracts geometric data from spatial data compliant with a plurality of different data formats; and
apply a spatial transformation to the geometric data extracted and abstracted from the data.

16. The computing system of claim 10, wherein the index module comprises instructions that when executed by at least the processor cause the processor to:
map, by at least the processor, regions of the data space containing data with leaf nodes of a spatial index tree, wherein the IRDD is created by:
mapping leaf nodes associated with regions that contain the spatial data within the query window to the candidate partitions in the IRDD, and excluding from the IRDD leaf nodes associate with regions of the data space that contain the data located outside of the query window.

17. A computer-implemented method, the method comprising:
receiving, by at least a processor, a query window defining a portion of a spatial data space to be queried for spatial data, wherein the spatial data space is partitioned into a plurality of partitions;
identifying, by at least the processor, candidate partitions in the plurality of partitions that contain the spatial data within the spatial data space that spatially intersects with the query window;
creating, by at least the processor, an intermediate partition dataset comprising each of the identified candidate partitions;
limiting, by at least the processor, execution of a distributed function to the identified candidate partitions included in the intermediate partition dataset, wherein the distributed function processes at least one record in the candidate partitions of the intermediate partition dataset for inclusion in a result of the query; and
generating, by at least the processor, a data structure comprising the at least one record included in the result of the query; and
returning, by at least the processor, the data structure comprising the at least one record as the result of the query over a communication network.

18. The method of claim 17, wherein creating the intermediate partition dataset comprises:
mapping each of the candidate partitions from the plurality of partitions from the spatial data space to the intermediate partition dataset; and
excluding, from the intermediate partition dataset, partitions in the plurality of partitions that contain data spatially arranged outside of the query window.

19. The method of claim 17 further comprising:
determining, by at least the processor, that the at least one record spans a plurality of candidate partitions in the intermediate partition dataset; and
filtering, by at least the processor, at least one of the plurality of candidate partitions containing the record from the intermediate partition dataset to avoid inclusion of a record replica in the intermediate partition dataset.

20. The method of claim 17 further comprising:
launching, by at least the processor, an interface that extracts and abstracts geometric data from spatial data compliant with a plurality of different data formats; and
applying, by at least the processor, a spatial transformation to the geometric data extracted and abstracted from the data.

* * * * *

UNITED STATES PATENT AND TRADEMARK OFFICE
CERTIFICATE OF CORRECTION

| | | |
|---|---|---|
| PATENT NO. | : 11,194,762 B2 | Page 1 of 1 |
| APPLICATION NO. | : 16/849806 | |
| DATED | : December 7, 2021 | |
| INVENTOR(S) | : Briseno et al. | |

It is certified that error appears in the above-identified patent and that said Letters Patent is hereby corrected as shown below:

On the Title Page

On page 2, Column 1, item (56) under Other Publications, Line 6, delete "Statial" and insert -- Spatial --, therefor.

In the Specification

In Column 2, Line 6, delete "Resiliant" and insert -- Resilient --, therefor.

In Column 2, Line 12, delete "Resiliant" and insert -- Resilient --, therefor.

In Column 2, Lines 14-15, delete "Resiliant" and insert -- Resilient --, therefor.

In Column 2, Line 19, delete "Resiliant" and insert -- Resilient --, therefor.

In Column 9, Line 59, delete "FIG.4" and insert -- FIG. 4 --, therefor.

In Column 13, Line 50, delete "("Ion")" and insert -- ("lon") --, therefor.

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*